United States Patent
Han et al.

(10) Patent No.: US 7,496,637 B2
(45) Date of Patent: Feb. 24, 2009

(54) WEB SERVICE SYNDICATION SYSTEM

(75) Inventors: Cheng Han, Lexington, MA (US); Paul Lin, Nashua, NH (US); Marco Carrer, Nashua, NH (US); Wai-Kwong (Sam) Lee, Nashua, NH (US); Alok Srivastava, Chelmsford, MA (US)

(73) Assignee: Oracle International Corp., Redwood Shores, CA (US)

( * ) Notice: Subject to any disclaimer, the term of this patent is extended or adjusted under 35 U.S.C. 154(b) by 1129 days.

(21) Appl. No.: 10/121,633

(22) Filed: Apr. 12, 2002

(65) Prior Publication Data

US 2002/0143819 A1 Oct. 3, 2002

Related U.S. Application Data

(63) Continuation-in-part of application No. 09/584,318, filed on May 31, 2000.

(51) Int. Cl.
*G06F 15/16* (2006.01)
*G06F 17/00* (2006.01)

(52) U.S. Cl. .................. 709/217; 709/219; 715/234; 715/237

(58) Field of Classification Search ................ 709/203, 709/217, 219; 715/237, 234
See application file for complete search history.

(56) References Cited

U.S. PATENT DOCUMENTS

| | | | | |
|---|---|---|---|---|
| 6,041,308 | A * | 3/2000 | Walker et al. ................. 705/14 |
| 6,064,979 | A * | 5/2000 | Perkowski .................... 705/26 |
| 6,154,738 | A * | 11/2000 | Call .............................. 707/4 |
| 6,226,675 | B1 * | 5/2001 | Meltzer et al. ............... 709/223 |
| 6,289,382 | B1 * | 9/2001 | Bowman-Amuah ......... 709/226 |
| 6,542,912 | B2 * | 4/2003 | Meltzer et al. ........... 715/501.1 |
| 6,816,842 | B1 * | 11/2004 | Singh et al. ................... 705/59 |
| 2001/0034663 | A1 * | 10/2001 | Teveler et al. ................. 705/26 |
| 2001/0037415 | A1 * | 11/2001 | Freishtat et al. ............. 709/328 |
| 2001/0047276 | A1 * | 11/2001 | Eisenhart ....................... 705/1 |
| 2005/0187866 | A1 * | 8/2005 | Lee ............................. 705/39 |

* cited by examiner

*Primary Examiner*—William C Vaughn, Jr.
*Assistant Examiner*—Ranodhi N Serrao

(57) ABSTRACT

A syndicator for disseminating Web services and other resources from service and content providers to service consumers and for establishing and implementing subscription agreements specifying the terms upon which digital assets are provided to subscribers. A registration database stores a service description for each of a plurality of different Web services and other resources. Each stored service description contains an input processing specification, an output processing specification, and the specification of the business terms upon which the described service or resource is offered by its provider to subscribers. A subscription manager conducts a negotiation with a prospective subscriber and receives from the subscriber an acceptance of the business terms upon which a specified Web service or resource is offered to establish a subscription agreement. Event tracking records information describing the performance of each service on behalf of each subscriber to perform subscription accounting functions.

6 Claims, 5 Drawing Sheets

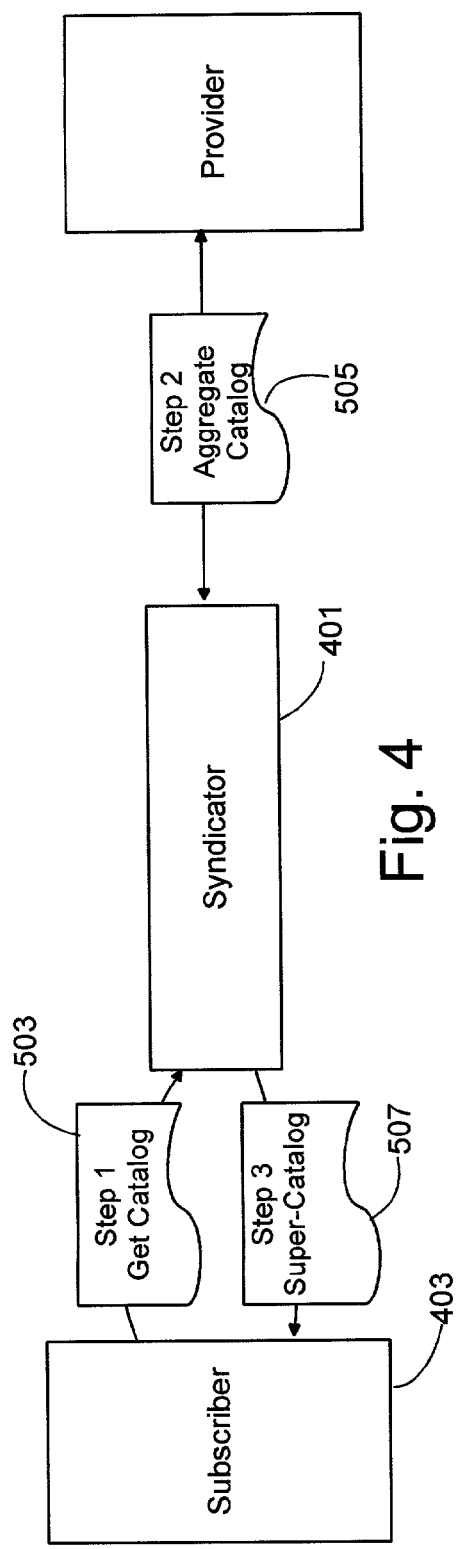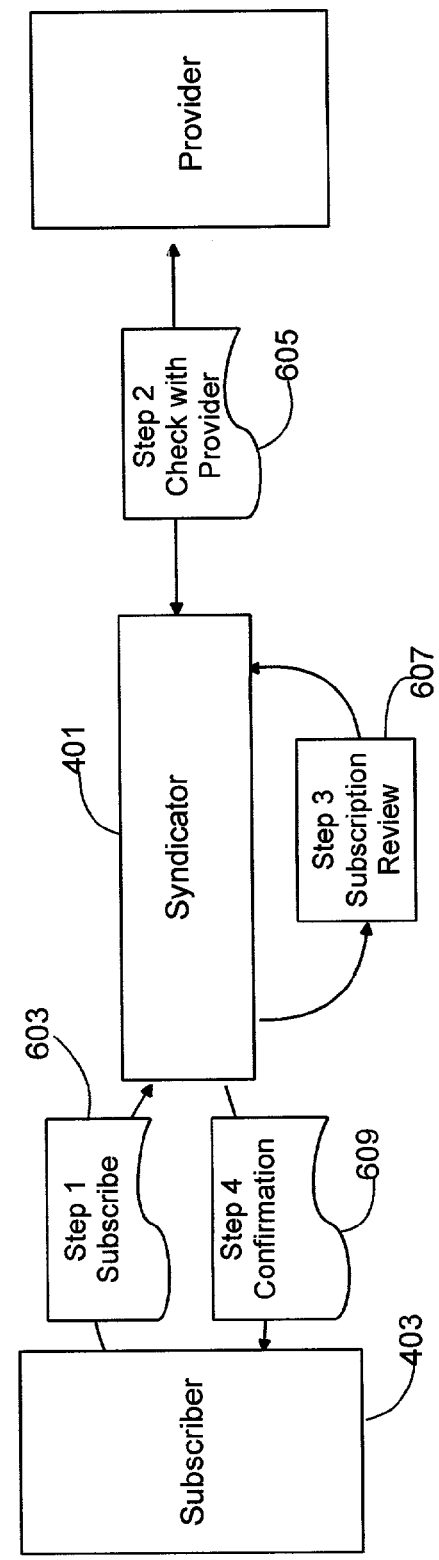

WEB SERVICE SYNDICATION SYSTEM

CROSS REFERENCE TO RELATED APPLICATIONS

This application is a continuation-in-part of, and claims the benefit of the filing date of, U.S. patent application Ser. No. 09/584,318 filed on May 31, 2000, the disclosure of which is hereby incorporated herein by reference.

BACKGROUND OF THE INVENTION

Web Services are business processes that can be discovered, accessed and automatically executed over the Internet using standard protocols. By using web services, a remote, service-providing application (the "provider") can be readily connected to a client application (the "consumer") using standard data formats and standard Internet protocols. Web services can interconnect applications that use completely different hardware platforms, such as mainframes, application servers, and web servers, and support connections among disparate operating systems such as Windows™, Java™, and Unix™. Web services enable developers to build e-business applications that can connect with any customer, supplier, and business partner anywhere in the world, regardless of the chosen platform or programming language.

Recently introduced industry standards have helped define, at least initially, the form that web services will most commonly take. XML (Extended Markup Language) provides a cross-platform standard format for encoding and formatting data. SOAP (Simple Object Access Protocol) specifies a lightweight protocol for exchange of the information in a decentralized, distributed environment using XML, eliminating the need to share a common program language or operating system. WSDL (Web Services Description Language) is an XML format for describing network services as a set of endpoints operating on messages containing either document-oriented or procedure-oriented information. Finally, UDDI (Universal Description, Discovery and Integration) defines the operation of web-based registries that expose information about a business or other entity and its technical interfaces (or API's).

These standards play an important role in implementing and executing web services, but they do not provide any mechanism for defining and supporting the business relationships between the providers and consumers of web services. Because web service providers will typically need to derive revenue from the web services they provide if those services are to remain viable, there is a need for a mechanism by which business relationships between service vendors and service consumers can be more easily defined and implemented. Although UDDI and WSDL provide standards which service providers may use to publish descriptions of their services that consumers can in turn use to identify and connect to desired services, these standards do not provide mechanisms for defining or implementing a business relationship between providers and consumers.

BRIEF SUMMARY OF THE INVENTION

The "dynamic services framework" described in U.S. patent application Ser. No. 09/584,318 provides methods and apparatus for obtaining information, including business information, from each of a plurality of resources which may be dynamically accessed via the Internet ("dynamic services") having different characteristics. A separate service description for each service is stored in a database called the services registry. Each service description includes: the address to which an information request may be transmitted; a specification of the nature of the input information to be supplied; a description of the nature of the output information to be supplied in response to request; and business information regarding fees to use the services, and license keys, etc, allowing the automation of business transactions for each service provider and the establishment of different pricing models, e.g. pay-per-use, block license fees, free use with associated advertising, etc.

Service requests identifying particular resources may be issued by application programs. A service interface program is then executed in response to each such service request to obtain the particular service description corresponding to the identified resource from the services registry. Before the service request is executed, accounting functions can be performed in accordance with the business information portion of the service definition. The interface program then transmits an output information request to the address specified in the service description, supplies input information meeting the specification contained in the service description to the resource, and routes output information provided by the resource to the requesting application program.

In the dynamic services framework, a registration module is preferably used to accept service description information in a predetermined format, preferably in Extensible Markup Language (XML) document which is validated and stored in the services registry. When a client sends a request for services to the services interface program, it obtains the service description for the desired resource from the database, transmits an output information request to the address specified in said the service description, supplying input information meeting the specification contained in said particular service description to said particular resource, and receives and routs output information provided by said particular resource in response to said output information request to the executing application program.

As contemplated by the present invention, the business relationships which govern the authorized use by consumers of dynamic services, including web services, are implemented using a syndication server or "syndicator" which catalogs available resources and employs a dynamic services framework to accesses those services under predetermined or negotiated contractual conditions on behalf of consumers that are modeled as "subscribers."

In accordance with the invention, the invention provides a mechanism for implementing a business relationship by defining the terms of subscription offers from service and content providers, implementing a procedure for negotiating selected terms of a subscription offer to form a business agreement, and utilizing standard protocols for the communications with providers and subscribers.

As contemplated by the invention, the syndicator aggregates subscription offers from service and content providers to form a catalog. In the preferred embodiment of the invention, a single catalog lists all services organized in multiple offer-group sections each of which lists all services available from a given content provider. Each web service is defined as a "content item" in an offer-group and specifies the parameters of the offer, some of which may be "negotiable."

In accordance with this feature of the invention, web services may be invoked by subscribers by sending a service request to the syndicator which in turn invokes the web service provider on behalf of the subscriber in accordance with the terms of the subscription.

Services and content are preferably made available to subscribers using a standard content syndication protocol, such as the industry standard Information and Content Exchange (ICE) protocol, to manage and automate the establishment of business relationships and managing the delivery of web services in accordance with those relationships. By implementing the delivery web services by extending the capabilities of a content syndication mechanism, web services are made available to consumers on a subscription basis in the same way that traditional content is made available by a content syndication server. In addition, other available resources, such as existing web sites and legacy systems, may be dynamically accessed using the dynamic services framework. In this way, the web services and other dynamically accessed resources are made available on a subscription basis along in the same way that traditional content (e.g. a data file) is provided by content syndication servers.

In order to use a dynamic service, such as a web service, the subscriber reviews the catalog published by the syndication server, identifies a selected offered service, and then participates in a negotiation process supervised by the syndication server with respect to any negotiable terms of the selected offer. The business relationship or "subscription" is defined by the fixed terms of the offer, and the negotiated terms agreed upon between the provider and the subscriber, and may include price, billing policies, content redistribution rights, copyright licensing, delivery quantities and channels.

The syndication server controls and monitors the execution of the offered service in accordance with business agreement, preferably using the industry standard Information and Content Exchange (ICE) protocol for content data transfer and result analysis. The web service may be delivered using a "PULL" model in which the subscriber sends an ICE request to the syndication server which then executes the web service from the identified vendor on behalf of the subscriber. Alternatively, the service may be delivered using a "PUSH" model in which the syndication server automatically invokes the web service on behalf of a subscriber based on a preset schedule or in response to a triggering event(s).

Service providers and subscribers use standardized routines for the delivery and capture of web services. A Content Provider Development Kit (CPDK) is distributed to each service provider and includes means for registering the provider with the syndication server, delivering services or content in response to PULL requests from the syndication server, PUSHING content to the server for distribution to subscribers (eliminating the need to service providers), and defining the terms upon which web services and other content are offered (defining pricing models and business practices). Similarly, each subscriber is provided with a Content Subscriber Development Kit (CSDK) that enables the subscriber to register with the syndication server, develop applications that use web services and syndicated content, receive a catalog from the server that contains service and content offers, post subscription requests, and receive content using PUSH or PULL.

The present invention accordingly extends the conventional functionality of a content syndication system by modeling web service consumers as subscribers, modeling web service providers as content providers, and modeling the invocation and execution of web services as the process of acquiring content in accordance with a business agreement called a "subscription". By defining and implementing web service business relationships as "subscriptions" and by using standard content syndication protocols to define and implement those subscriptions, the task of integrating web services into client applications is substantially simplified.

DETAILED DESCRIPTION OF THE INVENTION

FIG. 4 is a data flow diagram illustrating the manner in which catalogs are created and distributed by the syndicator;

FIG. 5 is a data flow diagram showing how subscriptions are created by the syndicator;

DETAILED DESCRIPTION

Figure 1:
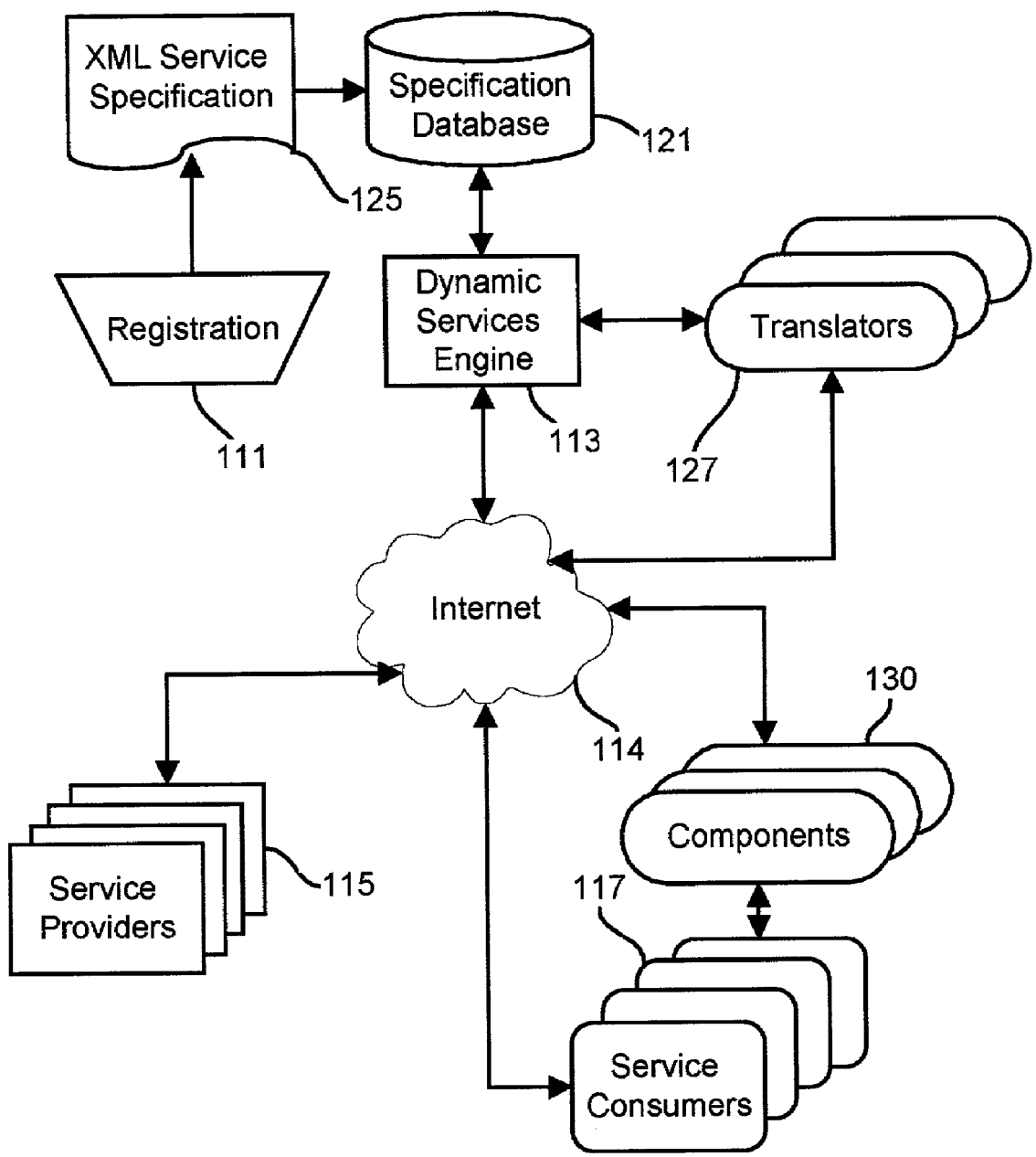
FIG. 1 is a block diagram which provides an overview of the architecture of the dynamic services framework employed to implement the present invention.

The embodiment of the invention to be described employs the Dynamic services framework as described in U.S. patent application Ser. No. 09/584,316, the disclosure of which is incorporated herein by reference, to convert a variety of diverse information-based resources, such as standards-based web services, retrievable data files, Internet web sites, legacy systems, databases, and other servers, into information services accessible to programs. Each service, as presented via an application program interface, conforms to a functional interface standard which provides the application programs with the metadata needed to access and integrate these resources for presentation to an end user.

Glossary

The glossary of terms below introduces terms which are frequently used in the following description.

Developers: developers refer to developers of Internet applications.

Dynamic Service (Service): a component within the Internet computing model that delivers a specialized value-added functionality. A dynamic service typically comprises some content, or some process, or both, with an open programmatic interface.

Dynamic Service Engine: an engine that provides storage, access and management of dynamic services.

Dynamic Services Framework: an open programming framework for enhancing a relational database Internet platform, such as Oracle8i, for service creation, deployment, access and management. It comprises dynamic service engine, a set of dynamic services, as well as users of dynamic services (service consumer).

Execution Adaptor: a routine that executes a service request in a particular flow. A flow could be as simple as relaying the request to contacting a service provider, or as complicated as relaying a request to a provider and relaying the response to another provider.

Framework: same as Dynamic Services Framework

Input Adaptor: a routine that post-processes the service input from consumers to produce the standard service input that is fed to the underlying service. An example is converting the unit of length from foot to meter.

Output Adaptor: a routine that transforms the raw output from the underlying service to the standard service response.

Protocol Adaptor: a routine that transforms the standard service request to the inputs needed by underlying service following the underlying protocol.

Service: same as Dynamic Service.

Service Consumer: the person who makes use of services in his context, typically some web application developer.

Service Descriptor: a descriptor defining the behavior of a service, containing service provider information, description of service functionality, service management information, service input adaptor, service output adaptor, and other provider-specific sections, such as secure access, caching parameters, etc.

Service Engine: same as Dynamic Service Engine

Service Engine Administrator: the person who perform administrative activities for the engine, e.g., enabling/disabling of services, tuning caching parameters of a service, etc.

Service Handle: a service handle is a logical representation of a service. In practice it is an in-memory structure that is used to create requests, send requests and fetch responses for the service consumer.

Service Invocation: a programmatic request for a service. After having retrieved a service handle, a service consumer can use that handle to make service requests. This invocation process is analogous to making method calls on an object. The life-cycle of an invocation starts when the request is made and ends when a response is returned to the consumer.

Service Provider: the person/organization that provides a service, typically the owner of some data resource or process, e.g., the owner of a currency exchange rate web site.

Service Registration: registration is the process of entering the service package into the Services Registry. This action is performed by the Service Administrator upon receiving a service package from the Service Provider and augmenting it by exercising deployment decisions.

Dynamic Services Framework

The "Dynamic Services Framework" used to implement the invention is shown in FIG. 1 of the drawings. As shown, the system operates under the programmatic control of application programs called Service Consumers (SC) which are executed on behalf of system clients as seen at 117. The application programs utilize access components 130 to send requests to and receive information from a Dynamic Services Engine (DSE) 113 which is connected via the Internet 114 to selected Service Providers (SC) indicated generally at 115. The service consumer application programs at 117 utilizes the information thus obtained to provide value-added information to the end users.

Before any of the Service Providers 115 are accessed by the DSE 113, Service Definition data called a Service Definition (SD) which describes each Service Provider is first stored in a specification database called the Services Registry (SR) 121 using a registration procedure indicated at 111. The registration procedure 111 supplies a Service Definition for a given service provider in the form of a service Descriptor document expressed in Extensible Markup Language (XML) as indicated at 125. The individual elements of each XML service Descriptor document 125 are mapped onto a predetermined service description schema in the specification database 121.

The database 121 is preferably a relational database which forms part of an integrated database system, such as the Oracle 8i System marketed by Oracle Corporation, Redwood Shores, Calif. 94065, a comprehensive platform for building and deploying Internet and enterprise applications.

The Java Virtual Machine, which forms part of the same machine environment used to execute the Dynamic Services Engine 113 and the functions of the database 121, is used to execute the translators, seen at 127 in FIG. 1 and discussed in more detail later. Each of the translators 127 preferably takes the form of a Java jar file supplied by the implementor to convert data in special formats from particular ones of the service providers 115 into a standard form which may be processed by other components of the system. Similarly, the Service Consumer application programs 117 can take the form of a Java program which executes within the Java Virtual Machine, and functions which are performed by the Dynamic Services Engine 113 can be implemented with Java programs executed by the same Java VM.

It should be noted that communications facilities other than the Internet 114 illustrated in FIG. 1 can be used to provide the communications links which couple the service providers 115 to the Dynamic Services Engine 113 and to the Service Consumer application programs 117. Similarly, data transmission facilities other than the Internet can be used to provide the communication links which couple client machines to the services provided by the system. These other communications facilities include leased line connections, mobile phone links, and anything else that can communicate with the host system (e.g. Oracle 8i) via HTTP, IIOP, SQL*NET, Mobile Gateways, and the like.

Service Definition Database

As contemplated by the invention, diverse external resources are made accessible to application programs by access mechanisms which utilize Service Definition data stored in the database 121. The Service Definition which describes each of the resources provided by the service providers 115 is used to expose that resource to application programs as a standardized service.

Program developers who wish to use a particular resource, such as an Internet web site, to provide information to one or more application programs, or a service provider who desires to make a resource generally available to program developers and users, follows a standard registration procedure, indicated at 111 in FIG. 1, to create and store the Service Definition data that the Dynamic Services Engine requires to provide access to that resource.

As contemplated by the invention, the Service Definition is preferably provided to the system as a service definition XML document 125. XML possesses a number of desirable features which make it particularly well suited for the expression of Service Definition data, including the existence of tools for creating and testing the syntax and validity of the specification data to be submitted. An XML schema, such as an XML DTD, may be used to specify the required and optional elements which should be present in each Service Definition. Tools constructed in accordance with the Document Object Module (DOM) standard may be used to provide an application programming interface (API) for the XML Service Descriptor documents. Standard XML editing tools may be used to prepare the XML data in compliance with a Service Definition schema, allowing the resulting data to be directly mapped into a corresponding schema used by the relational database 121 which is then accessed in the conventional way by the Dynamic Services Engine 113 or by an application program which can make use of the specification data.

The XML Service Descriptor document 125, and the corresponding data as stored in the specification database 121, may contains the following kinds of information:

1. Company Information: this information is use to identify the service provider and includes information to locate and contact the service provider (typically a company or individual) directly by mail, phone, email, company URL or other contact information. If the service provider's logo is to be used in connection with the service, that logo is specified.

2. Business Information: This section contains information regarding fees to use the services, license keys, etc, allowing the automation of business transactions for each service provider. The information available can be used to build different pricing models, e.g. pay-per-use, block license fees, free use with associated advertising, etc.

3. Security Information: Security information regarding each service permits the Dynamic Services Engine to perform security functions, either as built-in routines or as provided by others, to authenticate users, validate transactions, encrypt messages, etc.

4. Inputs: each Service Definition includes a list of inputs required to execute the service. At the time the service is executed, a request for each of the specified inputs is automatically presented to the user application program in an appropriate format in each user environment. This mechanism allows the services engine to separate functionality from the presentation, a key to providing the same service on different platforms. As part of the input, a user can also provide default values for each or all of the inputs. The default values could be a presented to the user as a list from which users can select a value. An input may simply a URI to point the Dynamic Services Engine to a particular service provider together a filename or method name to access the resource. In the common Internet scenario, an input specification could take the form of a specific URL with a specified GET or PUT method.

5. Outputs: Because the Dynamic Services Engine attempts to present heterogeneous services in a homogeneous environment, the list of outputs to be presented to the users as a result of service execution must be provide as part of the service description. If the service does not return data in a well-understood common format, or if the service provider does not wish to expose its standard output to the system, a Java jar file may be specified as part of the output description, with the Java file acting as one of the translators 127 seen in FIG. 1 to implement a standard interface specified for use by the dynamic services system. When such a resource is accessed, the services engine 113 identifies the jar file from the database 121 and uses the selected Java translator 127 to provide the desired interface to the specific service provider resource 115. When the particular resource at 115 is accessed, the service engine 113 only processes those outputs which are specified in the outputs section of the Service Definition for that resource.

6. Contact Information. Contact information from the service descriptor is used to send a message to the owner or manager of the service provider which does not properly respond to a service request. This notification message may take several forms, including email, a pre-recorded or synthesized voice message to a designated phone number, a fax transmission, a pager message, etc.

7. Update Information. The services engine will periodically search for updated service information from time to time at a location or locations specified in the Service Definition, which also specifies the frequency with which the update check is to be performed. Optionally, a user or service provider can send a message to the service engine after an update is completed, or can post a new location specification from which further updates will be provided.

8. Automatic Test Information: the Service Definition includes fixed input and output values which may be used to test the operation of a specified service. In this way, a malfunctioning service provider can be distinguished from failures caused by communication delays or the like. Automatic tests using this information can be performed periodically to help ensure system integrity, and can also be performed after updates or refresh operations to ensure proper operation of each service.

9. Caching Information. This section of the service description captures the service driven caching parameters. Items in this section instruct the services engine to use or not use cache memory for a particular operation, and inform the engine how long he cached data should be retained and when it should be considered to be expired. When services are known to present static data which changes only infrequently, requesting retention of fetched data in the cache can both reduce network traffic and provide faster service.

10. Additional Information. Beside the classes of information noted above, additional information may be stored in the specification database for each service provider resource, including usage log data, information to be presented back to the service provider for its use, or information used to customize or tune a particular service.

The Dynamic Services Engine

Figure 2:
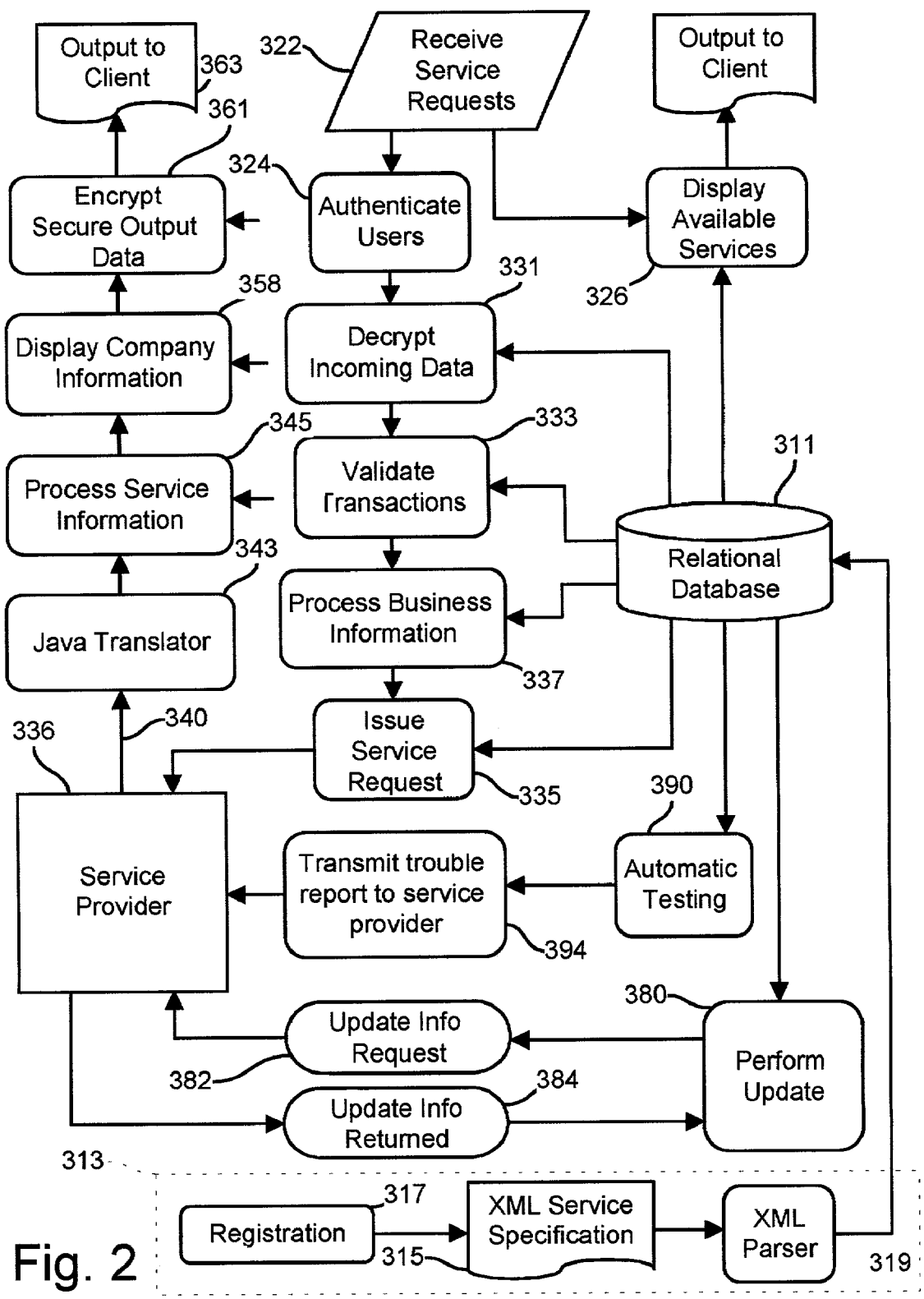
FIG. 2 is a data flow diagram which illustrates the operation of the present invention.

FIG. 2 of the drawings illustrates the operation of the Dynamic Services Engine, shown at 113 in FIG. 1, in more detail.

As noted above, before the services engine can process requests for services, each available resource is first described in an XML Service Definition which is translated and stored in the Service Definition database, shown 311 in FIG. 2. All Service Definitions stored in the database 311 are structured in accordance with a predetermined database schema.

The Dynamic Services Engine includes a generic registration module seen within the dotted rectangle 313. The registration module accepts an XML Service Descriptor document 315 from an available source, such as an XML editor, a web application that processes POST data from an HTML form, or any other suitable source as indicated at 317.

The XML Service Descriptor document 315 preferably identifies a standard XML schema which specifies the required and optional elements to be included in the XML Service Definition. An example DTD which specifies illustrative XML schema for the Service Definition elements is set forth at the beginning of the accompanying appendix, and is followed by listings for a set of illustrative Service Definition XML documents which comply with the schema.

The form and function of XML an XML schema data is defined in a formal specification, REC-xml-19980210, Extensible Markup Language (XML) 1.0, issued by the Word Wide Web Consortium, the current version of which (issued on Feb. 10, 1998) is available on the Web at http://www.w3.org/TR/REC-xml. As stated in that document, the Extensible Markup Language, abbreviated XML, describes a class of data objects called XML documents and partially describes the behavior of computer programs which process them. XML is an application profile or restricted form of SGML, the Standard Generalized Markup Language [ISO8879]. By construction, XML documents are conforming SGML documents.

XML documents are made up of storage units called entities, which contain either parsed or unparsed data. Parsed data is made up of characters, some of which form character data, and some of which form markup. Markup encodes a description of the document's storage layout and logical structure. XML provides a mechanism to impose constraints on the storage layout and logical structure. A software module called an XML processor is used to read XML documents and provide access to their content and structure. It is assumed that an XML processor is doing its work on behalf of another module, called the application. The XML specification noted above describes the required behavior of an XML processor in terms of how it must read XML data and the information it must provide to the application.

A second specification, also developed by the World Wide Web Consortium, REC-DOM-Level-1-19981001, Document Object Model (DOM) Level 1 Specification Version 1.0, available on the Web at http://www.w3.org/TR/WD-DOM-19980318, defines the Document Object Model Level 1, a platform- and language-neutral interface that allows programs and scripts to dynamically access and update the content, structure and style of documents. As stated in the DOM recommendation, the Document Object Model provides a standard set of objects for representing HTML and XML documents, a standard model of how these objects can be combined, and a standard interface for accessing and manipulating them. Vendors can support the DOM as an interface to their proprietary data structures and APIs, and content authors can write to the standard DOM interfaces rather than product-specific APIs, thus increasing interoperability on the Web.

As seen in FIG. 2 at 319, each XML Service Descriptor document 315 is parsed into its constituent data elements and those data elements are then mapped into and stored in the database 311 in accordance with the standard Service Definition schema. Numerous XML parsers, including the XML parser which forms part of the Oracle 8i platform, can be employed to process the XML document. The Oracle Internet Platform includes built-in XML-support for exchanging XML data over the Internet using the W3C standard, and includes an XML Parser for Java, an XML Class Generator, and an XML Parser for PL/SQL. The Oracle XML parser for Java can be executed by Oracle 8i's Java VM, and enables parsing of XML documents through either SAX or DOM interfaces using a validating mode for testing each incoming Service Definition against the Service Definition DTD. When it is necessary of desirable to alter or update an existing Service Definition, a revised XML document is supplied via the registration module 313.

When an available resource has been registered with the dynamic services system, all or part of the information or processing services which are available from that resource can be programatically accessed by an application program which issues a service request. When a service request is received, the Dynamic Services Engine processes the request against security information stored in the database 311 to authenticate the user and validate the request as indicated at 324.

By accessing service description data in the database 311, the services engine can respond to generic requests by displaying a list of available services. In addition, by accessing the inputs specification for a selected service, the input data required by that service can be presented to users in a manner which is appropriate to that service in different environments. At the time the service is executed, a request for each of the specified inputs is automatically presented to the user application program in an appropriate way in each user environment. This mechanism allows the services engine to separate the functionality from the presentation, a key to providing the same service on different platforms. As part of the input, a user can also provide default values for each or all of the inputs. The default values could be a presented to the user as a list from which users can select a value. An input may simply a URI to point the Dynamic Services Engine to a particular service provider and a filename or method to access the resource. In the common Internet scenario, an input specification could take the form of a specific URL with a GET or PUr method.

Figure 3:
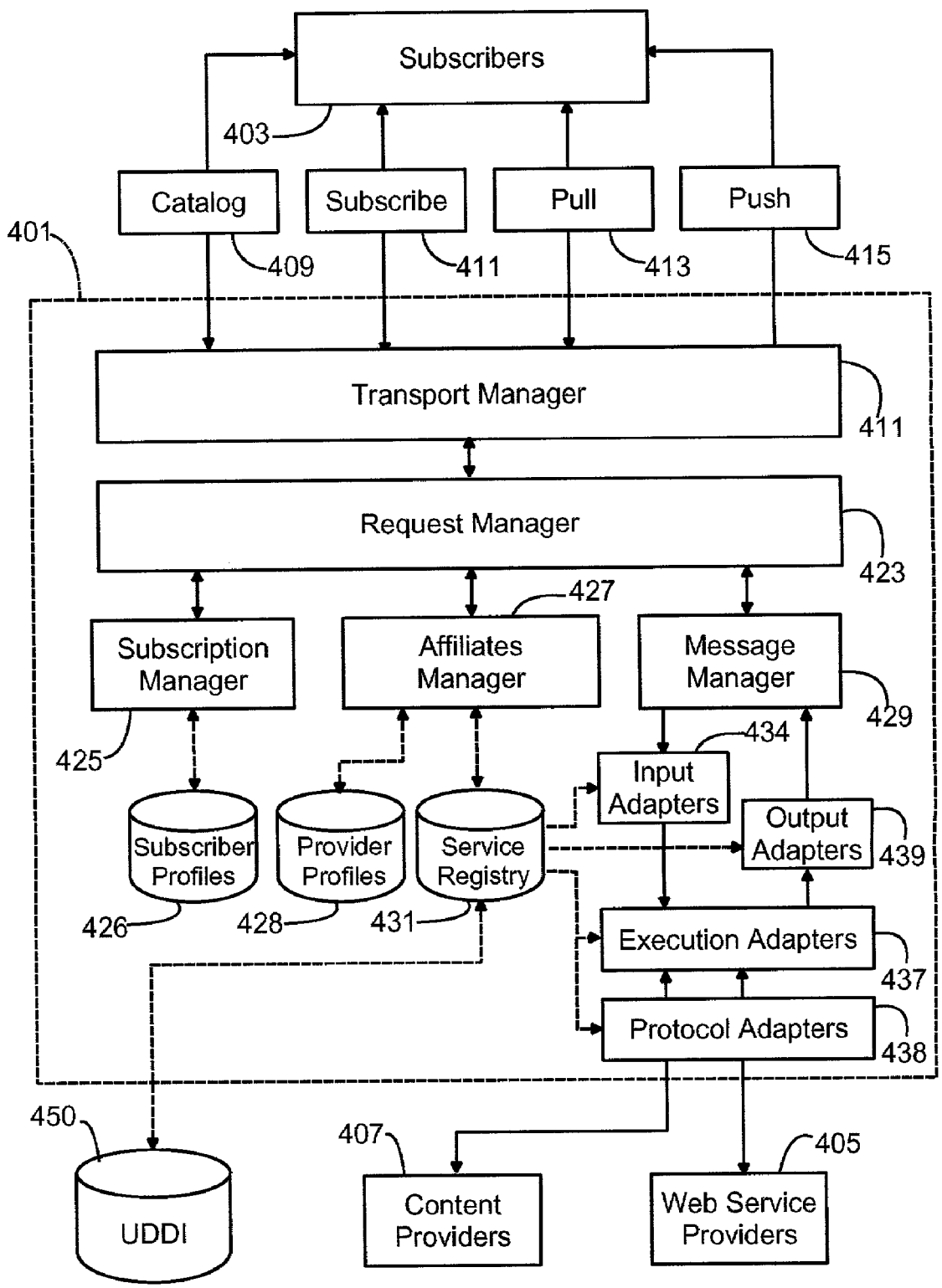
FIG. 3 is a block diagram illustrating the principle components of a "syndicator" which implements the dynamic services framework and models consumers as "subscribers" and models services as "subscriptions;"

If encryption is specified for incoming messages or input data by the Service Definition, decryption is performed as indicated at 331 in FIG. 3. Likewise, the content of incoming messages or input data can be validated as specified by the Service Definition as illustrated at 333. Next, as seen at 337, before the service request is executed accounting functions can be performed in accordance with the business information portion of the Service Definition. Finally, when these steps are completed, a service request is transmitted to a service provider 336, a resource specified in the Service Definition as indicated at 335. As noted earlier, this service request can take the form for an HTTP message to a particular URL and method, passing input data to the resource in the manner specified the inputs portion of the Service Definition.

The service provider (typically a remote web site) returns output data to the Dynamic Services Engine as seen at 340. If the data returned by the service provider 336 is not already in a standard form, the Service Definition of that resource identifies a Java jar file which is executed as indicated at 343 to translate the data from the provider 336 into the desired standard format.

The output data from then is then formatted for presentation use by the client application program as indicated at 345. The output data is published for use by the requesting application in an output format specified in the output section of the Service Definition. If so specified in the Service Definition, company information and/or a company logo can be added to the output data from. the service provider as seen at 358, and the data may be encrypted as seen at 361 before being sent to the requesting application program as indicated at 363.

The client application program commonly takes the form of a Java program which executes within the same environment as the Dynamic Services Engine and performs specific operations on the data. The dynamic services infrastructure may be used to particular advantage to integrate data from several different resources into a single presentation to an ultimate user. By way of example, an application can obtain data from a plurality of different registered online retail sites, perform price comparisons, and present the results to a user. A second application could obtain foreign currency exchange rate information from one web site, and obtain price information on stocks or products from other web sites, and present results in a particular currency selected by a user. In each case, the application program can present data integrated in this fashion in ways that are compatible with any device that can connect to the service, such as Personal Data Assistants (PDA's), web servers, mobile phones, and the like.

As indicated earlier, the Service Definition includes contact information which allows the system to periodically issue requests to update the Service Definition data. The person or entity to whom the update request is sent, together with the frequency with which the update requests should be issued, are recorded in the specification data for each resource. Typically, the service provider is contacted as shown at 380 and 382 and, thereafter, the service provider or other person to whom the update request is sent, may respond by submitting new information through the registration mechanism as seen at 484 to modify the Service Definition data in the database 311.

As indicated at 390, test information stored for each service is employed to periodically test the external resource, typically by transmitting standard input data and then comparing the response to standard test output data. If the test reveals a problem, an error report can be sent to a destination address, such as an appropriate person in charge of the service provider, to inform that person of the problem as indicated at 394.

To improve system performance and reduce network traffic, caching information may be stored for each service which indicates the extent to which output data from the service should be cached, and how long cached data should be retained.

Preferably, means are included for recording the nature of transactions performed by the system in a log file, and to record feedback from both client applications and from end users regarding the system, its use, and its performance. Processing means may be incorporated into the system for analyzing both the performance history and the feedback received in order to provide quantitative parameters and descriptive data which describe the performance of the system.

Service Definitions for the Service Provider

From a service provider's point of view, a service is modeled through an XML document called service descriptor, which provides a centralized source of description for the service. An example Service Descriptor for a Currency Exchange Service can be found in part B of the Appendix.

A service is defined by a multitude of logical components, all of which are specified in the service descriptor, at least in part, if not specified in other documents that the descriptor refers to. There are two sections of the descriptor, one focusing on the higher level descriptions of the service, known as the service header, and another delving on the details of implementations of the service, known as the service body.

Service Header

The service header contains high-level descriptions of the service. For the most part, information specified here is descriptive and non-interpretive for browsing and documentation purpose. The exceptions are service interface specification and service identifier.

Naming Specification

Naming information contains a globally unique identifier as well as short and long descriptions of what the service does. Each service will be addressed through an absolute name specified using the URN (Universal Resource Naming) conventions. Universal Resource Naming is described in detail in the Internet Request For Comment document IETF RFC 2141. UUID used by ICE was considered as an alternative.

Version Specification

The service header includes version information with pointers on how and where the service update is to be performed. Coupled with support contacts from the service provider Information section, this bit of information is critical for service maintenance.

Service Provider Information

High-level information about the service provider can be specified, including the provider's company name, copyright information, and company URL. Detailed information drills down further into contacts for support and URLs for logos. This information is provided in the form of an X-Link that will point to another XML document. In order to make use of this XML Document, the Dynamic Services Engine has to be aware of the semantic mapping between the XML Schema that it follows and the internal storage structure inside the registry. There will be an initial set of schemas that the engine will semantically understand. In the future, plugging in additional parsers for new schemas can augment this set. This allows the Dynamic Services Framework to embrace emerging standards for representing data such as company information I contacts that will have been heavily used in existing applications.

Deployment Specification

Optionally, specified in the descriptor is a set of deployment properties comprised of suggestions from the service provider to aid the service engine administrator during registration time. They include classification guidelines with hierarchical categories as well as flat keywords, and recommendations of caching parameters. This information is also provided in the form of an X-Link that will point to another XML Document specifying the classification schemes. Again, this is to allow for existing or emerging standards on schemas that data used for categorization will adhere to. The values specified in this section are only suggestions to a service administrator during service registration. The values stored in the Services Registry could be different from the values specified in the descriptor. Note that in other sections, certain parameters can be specified to be deployment options so that the administrator can set them up appropriately at registration time.

Service Interface Specification

The Service Header allows for the definition of an interface characterized by the schema specifications of its input, output, and exceptions. The specifications can be dispersed in external XML-Schema documents or they can be embedded in the Service Descriptor. The location of the XML-Schemas is specified by URLs: when a relative URL is used, that is relative to the service package submitted by the service providers. Absolute URL can be used to address XML-Schemas stored on external registries or repositories (e.g. integration with the OASIS registry). The DSE may also retrieve input/output XML Schemas from external registries such as xml.org. It should be also be able to insert/update/delete XML Schemas at external registries on behalf of the user. By specifying these schemas, the service provider enforces the syntax in which consumers send requests to it, as well as the way in which it provides the responses. The validation will be done in the Service Engine when a consumer sends a request, before the actual service provider is contacted.

The service provider can also suggest a name for the interface, which is a deployment option and can be overwritten by the service administrator. Any new service that conforms to the same service interface must provide the same input/output/exception definition. The engine will also expose to consumers the capability to search for services by interface. Two services that conform to the same interface are considered compatible services, a concept useful for fail over.

To facilitate the development of code that will work with the Dynamic Services Framework, class generators can be used to create Java classes that map to the request/response XML-Schemas. A Java class generator may be provided as part of the client toolkit: it will be able to fetch the schema from the service engine and generate appropriate classes for easy manipulation on the client side.

Service Body

The Service Body contains more detailed descriptions for each one of the components in the Dynamic Services Engine (DSE) that will be employed at execution time. Specifically, it is sectioned into details on the input, protocol, execution, exception, and output. The service provider can specify an adaptor that needs to be used at each level, be it supplied by the engine or the provider. The functionality of each adaptor will be discussed in each of the following sections. In addition to the adaptors, other service specific parameters may also be specified.

Input Specifications

The input section specifies the list of necessary as well as optional processing on the request that comes in from the consumer.

Input: Rendering Directives

Under normal execution flow, the request XML that the consumer submits or sends to the service engine will be validated with the Input XML-Schema that is specified previously in the header. However, the DSF allows a service provider to optionally supply some form of Schema Mapping specifications (e.g. through XSL Transformation) that could map this Input XML-Schema to a presentation form such as HTML or WML (Wireless Markup Language). As a result, the consumer can easily provide to its clients (remember that our consumers are application developers) a way to input service requests, for applications that have an HTML or WML interface.

Notice that the engine is not responsible for the rendering: all that the engine is responsible for is the capabilities to store and retrieve the mapping. The engine only provides the mapping(s) of the transformation. The actual transformation is done on the consumer side by the client toolkit. If we have a mapping of the schema into an HTML form, the consumer can use the mapping to render the Input schema to an HTML form for his web application. He can then transform the HTTP Requests back to an XML document, which conforms to the XML-Schema specified by the service provider. Finally, the request XML will be sent to the service engine formulating a service request.

Input: Default value and aliases directives

Service providers may specify additional directives for the purposes of:

1) Default value: Filling in a default value for these parameters into the request XML for which the consumer specified no values. Service providers can also specify that the default value for those parameter must be validated at service deployment time. For example, for HTTP, specifying a XPath into the request XML addressing an element that represents one of the HTTP request parameters to be sent to the HTTP server. The directive can also provide mapping to the parameters that are not defined by the request XML schema, e.g., some HTML form hidden parameters. In this case, a value has to be specified.

In both cases, the value to be filled-in can be a user profile property fetched dynamically at runtime for each user. This information is opaque to the registration parser: The administrator will be prompted to enter a mapping through some API calls to the engine at deployment.

Input: Input Adaptor

The input adaptor section is an optional section, identifying an adaptor that further processes the service request before sending to the service provider. Examples of such processing include semantic or higher level validation of the request. This input adaptor specification is a fully qualified name of the class that will handle the processing. Such class will be either found in the service package given by the service provider during registration.

The service provider has the option of specifying some adaptor specific parameters in the PARAMETERS element under the adaptor, which is validated at service registration time and interpreted at runtime by the input adaptor. These parameters are opaque to the Service Descriptor parser and Services Registry.

Protocol Specifications

The protocol section identifies the way that service engine accesses the underlying service. For example, a service may be accessed via HTTP protocol while another service may be accessed via JDBC protocol. This protocol adaptor specification is a fully qualified name of the class that will handle the communication to the underlying service. Such class will be either found in the service package given by the service provider during registration or in the set of libraries that the service engine provides.

The service provider has the option of specifying some adaptor specific parameters in the PARAMETERS element under the adaptor, which is validated at service registration time and interpreted at runtime by the adaptor. For example, for HTTP, it may specify the HTTP method used and the URL that does the actual servicing. These parameters are opaque to the Service Descriptor parser and Services Registry.

Usually, service providers will choose to use protocol adaptors that have been pre-packaged with the engine, like generic adaptors for HTTP and an Oracle JDBC adaptor.

Execution Specifications

The execution section identifies the way in which the service is to be executed. Its responsibility is to take in the request XML and return the response from the underlying service provider. Execution adaptors can be standard simple adaptors that follow the simple path described above. They can also be complex adaptors that aggregate several services like in the International Portfolio example. This execution adaptor specification is a fully qualified class name of a class that will perform the execution. Such class will be either found in the service package given by the service provider during registration or in the set of libraries that the service engine provides.

The service provider has the option of specifying some adaptor specific parameters in the PARAMETERS element under the adaptor, which is validated at service registration time and interpreted at runtime by the execution adaptor. These parameters are opaque to the Service Descriptor parser and Services Registry.

The result of the execution adaptor is the response given back from the service. If the service is a simple service, the response will be in the native format of the service provider. For example, for a web-based service, the response may be in HTML format, and for database service, the response would be a java.sql.ResultSet object. If the service is a compound service, the response will be a structured service response.

Usually, if the service is a simple service, a service provider will use pre-packaged simple adaptor. If the service is a compound service or a simple service that has non-standard execution flow, the service provider will provide a custom execution adaptor.

Exception Specifications

The exception section identifies the way in which the exceptions are to be handled for this particular service. Output Specifications. The output section specifies the list of necessary as well as optional processing to produce the response to the consumer.

Output: Output Adaptor

The output section identifies the way in which the output returning from the execution adaptor is to be formatted in the way prescribed by the Output XML-Schema. This output adaptor specification is a fully qualified name of the class that will handle the transformation. Such class will be either found in the service package given by the service provider during registration or in the set of libraries that the service engine provides.

The service provider has the option of specifying some adaptor specific parameters in the PARAMETERS element under the adaptor, which is validated at service registration time and interpreted at runtime by the adaptor. These parameters are opaque to the Service Descriptor parser and Services Registry.

Usually, for simple services, service providers will either use the pre-packaged adaptors such. as XML Adaptor and JDBC ResultSet Adaptor, or they will provide custom. adaptors. For compound services, service providers will use a NULL Adaptor since the response from the execution adaptor will often be in the proper format prescribed by the Output XML-Schema.

Output: Rendering Directives

As far as the service execution flow is concerned, output section is the final stop. However, additional mechanisms are provided for the service provider to optionally specify mappings (e.g. in the form of XSL Transforms) that will map this response XML to other forms such as HTML or WML. Consumers, rather than service engines, are responsible to make use of the transformation to render the desirable output.

Service Definition from the Service Administrator

Service providers will package their service definitions in to a service package: as said before a service package contains a service descriptor, the XML-Schemas or their locations, and optionally a set of Java class files. It is then responsibility of the Service Administrator to take the service package and register it to the Dynamic Services Engine instance he is managing. During such registration, he will be assisted by the Dynamic Services Administration Tools.

During registration, information found in the descriptor and all other sources that it refers to will be used to create a logical representation of the service in the Services Registry. Such a process will involve an interaction with the Service Administration who will be asked to specify the value for the service deployment parameters. Deployment parameters are defined as parameters that are specific to the deployment of a service within a Dynamic Services Engine instance. They include:

a. Naming and classification of a service. The category under which the service should be registered as well.
 b. Deployment input values: the values for some of the service request parameters that have been tagged as deployment time inputs by the service provider. Such feature can be used to model a business relationship where the service provider publishes a service that accepts a username/password and license key as inputs. At the deployment time, the Service Administrator establishes a business relationship with the service provider and acquires the username/password and license key to be used within his Dynamic Services Engine.
 c. Caching policies: Strategies employed by the service engine administrator possibly include basic scheduling, pre-fetch, cache on request, and MRU/LRU cache replacement considerations in cases where cache resources allocated are limited.
 d. Check for updates and service regression. A frequency to be used for checking if new versions of the service packages have been made available by the service provider or if the service is unavailable.
 e. Fail Over: Create through the Dynamic Services Administrator Tools a Fail Over Service for such service under registration
 f. Others: other parameters include logging.

After registration/deployment, these decisions taken by the Service Administrator will be materialized and stored in the Services Registry. As a result, when the service is exported from one service engine to another, the information contained in the exported service descriptor will include the deployment choices made by the original administrator; hence the properties found will be a superset of those found in the original service descriptor. A Service Administrator XML schema can be used to validate an exported service descriptor XML document.

Service Registry Component

Services Registry, which forms part of the specification database shown at 121 in FIG. 1, stores and manages all the services in a service engine. It provides facilities for registering a service, unregistering it, modifying it, and searching the registry for a set of services satisfying a given criteria. From a Service administration point of view, other requirements are:

a. When a service is being updated, any service invocation of the same or dependent services has to be invalidated.
 b. Ability to register/unregister/update a set of services as a single transaction is desirable.
 c. Dependency tracking in service unregistration is desirable for compound services.
 d. Access control is preferably enforced by the registry. The Service Administrator should be able to decide whether a service can be accessible by consumers or not. For example, he can choose to expose the generic stock quote service to some consumers, but keeps Yahoo stock quote nor Bloomberg stock quote services inaccessible from any consumer. In addition, the access control mechanism should provide role-based access control for different service consumers.

Facilities for bulk loading are also desirable, but only to a limited extent due to the size of the registry which is sized to anticipate at most on the order of thousands of services.

Code layering/system Services/paths

From an architecture perspective, the Services Registry is an independent component, shared by one or more service execution engines. In addition to services, the specification database 121 also manages user profiles, which are described later. An execution engine logically accesses the registry whenever service information is needed. However, in practice most of the service access may be provided by the Services Registry cache at the execution engine. The architecture provides flexibility in scaling the service engine to a large amount of users (potentially geographically distributed) by simply adding additional service execution engines. The runtime performance of service access, on the other hand, will be satisfied by the cache.

The Services Registry exposes these features for any components that need to access some information about a service. For example, ExecutionManager will need to obtain the default values to preprocess the input request; client library will need to access the registry to lookup services. Any implementation details should be hidden and completely controlled by the registry module.

The central registry is preferably implemented using an LDAP directory, such as the Oracle Internet Directory (OID). See generally, *LDAP: Programming Directory-Enabled Applications with Lightweight Directory Access Protocol* by Tim Howes and Mark Smith, ISBN 1-57870-0000-0 (Macmillan Technical Publishing-1997).

Communications of DSE to External Entities

The following description details the communication between a service engine and an external entity. In general, there are two types of external entities: the application logic of a service consumer 117, which needs to connect to a service engine, lookup a service, and execute a service; and the application logic of the tools for service administrators, which needs to perform additional administrative tasks such as registration and unregistration of services.

Service engines communicate with external world through message queues in the engine. When an external entity needs to perform a certain action, for example, executing a service, the client library common foundation will send a correspond message to the request queue. A request handler in the service engine will listen to the queue, fetch the request message, and invoke appropriate engine components, for example, execution manager. When the operation is done, service engine will post the response in the response queue. A listener in the client library common foundation will listen to the response queue, and invoke appropriate callback method.

Event Manager and Related Services

The Event Manager is a component of the dynamic services engine that tracks actions taken in the flow of an execution. In essence the engine should be able to make use of all this information for purposes of logging, billing, etc. The model followed should be one where it is possible for components interested in auditing, to add themselves as listeners to the EventManager. Components internal to the DSE will generate the events and post to the EventManager which will dispatch them to the appropriate listeners. Appropriate event classes should be used for each one of these actions. Events generated by the DSE will also contain information about the user that triggered the operation that generated them so that logging and billing logic can be applied on such information.

The Event Manager interface exposed would give access to all of the events tracked/saved in a systematic manner. Other modules can be attached to the EventManager to make use of the information tracked by the EventManager. A set of modules providing some system services may be provided:

a. Logging services can reorganize these events in some systematic way for use with other modules or even applications, e.g., third-party log analysis applications, system debugging and profiling report tools, etc.

b. Billing services can use this information to track how much a consumer is using the services and therefore how he is to be billed accordingly. The billing module may provide an API to attach billing applications, e.g., Oracle iPayment, to the service engine.

c. Notification services can notify administrators (or any other relevant personnel) certain system-generated events, e.g., service execution failure. It can provide an API to attach different notification methods, e.g., email, pager, short messaging, Oracle Enterprise Manager, etc.

d. Trigger services allow administrators to execute administrator-defined services upon the occurrence of some events. For example, a user-quota service trigger can be activated before a service is invoked to audit resource allocation. An execution of a trigger is guaranteed to start at the same state as the event that triggers it.

There are two types of triggers: passive triggers do not affect the execution flow of the logic that generates the event. Active triggers, on the other hand, can affect the execution flow of the logic that generates the event, e.g., a user resource auditing trigger can stop the execution of a service if the user has exhausted his quota.

While a set of system services are the clients of the EventManager, administrators may provide additional event-based services indirectly through defined hooks: Trigger Services and Billing Services. Service Providers, on the other hand, can affect the event system by defining and posting additional events in service-specific adaptors. Service Consumers do not interact with the event system.

Web Service Syndication

The dynamic services framework in connection with FIGS. 1 and 2 may be employed to advantage to implement a "syndication server" or "syndicator" which is may be used to define and execute web services, as well as to provide content, provide access to legacy applications, and other forms of dynamic services, with the consumer being modeled as a "subscriber" and the web service or other resource being modeled as a "subscription."

This feature of the present invention enables consumers to use web services from service providers by utilizing a "syndicator" that mediates, negotiates and manages the service definition, invocation and execution process. Such a syndicator, indicated generally at 401 in FIG. 3, communicates with subscribers at 403 and with both service providers at 405 and content providers at 407. The syndicator 401 distributes up-to-date content to the subscribers 403 by invoking and dynamically executing services available from the service providers 405 and by retrieving content from the content providers 407. As described in more detail below, the syndicator 401 manages the subscriptions which define the terms upon which subscribers and providers exchange information, presents catalogs which identify and describe offered services and content, manages the secure exchange of information, interacts with intermediary billing services, and manages PUSH content scheduling.

As indicated at 409, the subscribers 403 interact with the syndicator 401 to receive catalog information containing service and content offers. As seen at 411, a subscriber 403 establishes a subscription by selecting a desired service and accepting the terms upon which that service is offered by the provider. The terms of an offer may specify price, delivery policies, content formats, security preferences, etc. Some terms of an offer may be fixed while others are established by a negotiation process. After the business relationship which makes up a given subscription are determined at 411, the subscriber may "pull" digital assets from the syndicator by subsequently issuing a request as indicated at 413, or may receive information which is "pushed" to the subscriber on a scheduled or event-driven basis as indicated at 415.

The service providers 405 and the content providers 407 are the ultimate source for the digital assets made available to subscribers under the terms of a subscription set up by the syndicator 401. The providers 405 and 407 inform the syndicator 401 when new or updated information becomes available to eliminate the need for polling, or the providers may dynamically supply information when requested by the syndicator 401.

The terms upon which a specific service is made available are defined by an "offer" that forms an individual item in the catalog. An offer is included in a content offer group and is the smallest atomic unit of data in the catalog. An offer defines the delivery and business terms upon which a service or specified content is made available.

Information and Content Exchange (ICE) Protocol

The preferred embodiment of the invention employs the industry-standard Information and Content Exchange (ICE) protocol to manage and automate the establishment of subscriptions, data transfer, and results analysis, such that both content and services are made available using a scenario consistent with conventional content syndication. The ICE Protocol is described and defined in the World Wide Web Consortium Note dated Oct. 26, 1998 entitled "*The Information and Content Exchange Protocol*" available on the World Wide Web at http://www.w3.org/tr/note-ice. The present invention's use of the ICE protocol makes web services available to consumers using a familiar protocol previously used for static content (e.g. data and program files), extending the capabilities of the "syndication" framework to include not only traditional content but also web services and other kinds of dynamically executed services.

Four general types of operations are covered by the ICE protocol: (1) subscription establishment and management; (2) data delivery; (3) event logs and (4) miscellaneous operations, such as the ability to renegotiate protocol parameters in an established relationship and the ability to send messages and queries.

From the ICE perspective, a relationship between a syndicator and a subscriber begins with some form of subscription establishment. In ICE, the subscriber 403 typically begins by obtaining a catalog of possible subscriptions (offers) from the syndicator 401 as shown at 409. The catalog provided to a particular subscriber may be filtered or personalized according to the subscriber's profile, such as business agreements, preferences, etc. The structure of a catalog defined by ICE protocol consists of subscription offer groups. Each offer group has a set of offers as the finest unit for subscribers to choose from. For every offer, the ICE protocol supports and defines the structure of associated delivery policies, usage reporting, presentation constraints, and business terms. The subscriber 403 then subscribes to particular subscriptions, possibly engaging in protocol parameter negotiation to arrive at mutually agreeable delivery methods and schedules as indicated at 411.

The relationship then moves on to the steady state, where the primary message exchanges center on data delivery. ICE uses a package concept as a container mechanism for generic data items. ICE defines a sequenced package model allowing syndicators to support both incremental and full update models. ICE also defines push and pull data transfer models. Managing exceptional conditions and being able to diagnose problems is an important part of syndication management; accordingly, ICE defines a mechanism by which event logs can be automatically exchanged between (consenting) subscribers and syndicators.

Syndication Architecture

The syndicator 401 employs a transport manager 421 to communicate with the subscribers 403. The transport manager 421 implements standard protocols providing, at the minimum, a secure HTTPS connection for performing secure information exchanges with the subscribers. The transport manager 21 provides an industry standard HTTP "web listener" to receive and send messages. In addition, the transport manager may use other protocols, such as SMTP for email exchanges, FTP for file exchanges, and WAP for exchanges with wireless devices such as cell phones and PDAs. For web services, The ICE protocol is preferably used to distribute catalogs and to establish and monitor subscriptions, whereas the web service requests and responses are typically packaged as SOAP messages in accordance with the Simple Object Access Protocol, the most recent version of which is described in the SOAP Version 1.3 Specification, W3C Working Draft dated Dec. 17, 2001, available at http://www.w3.org/TR/soap 12-part0/.

The request manager component 423 of the syndicator 401 acts as a coordinator and dispatcher, receiving incoming messages and passing them to a subscription manager 425, affiliate manager 427 or a message manager 429 as needed. The subscription manager 425 creates and maintains subscriber profile data and mappings between subscriptions and offers as indicated at 430.

The affiliate manager 427 creates and maintains profile data for the service providers 405 and the content providers 407 as indicated at 431, and manages the creation and use of the content provider input adapters seen at 434 and the output adapters 436. The adapters 434 and 436 operate as an extensible layer that performs access and formatting functions to accommodate the characteristics of individual providers.

The message manager 429 automatically packages the information to be exchanged into ICE, SOAP or other appropriate message format and handles protocol exchanges, but is extensible to permit information to be exchanged using protocols other than ICE and SOAP.

The input adapters 434, the output adapters 435, the execution adapters 437 and the protocol adapters 438 are used to invoke services from the web service providers 405 and to request and receive content from the content providers 407. Web services may be accessed on a subscription basis from the web service providers 405 in the same way that conventional content (such as data and program files) is obtained from content providers 407. The input, output, execution and protocol adapters are used to dynamically obtain information from heterogeneous sources, including not only web services, but also existing web sites, databases, enterprise applications, e-mail repositories, and legacy systems.

The service registry 431 contains service descriptions which describe each content and service resource that is made available on a subscription basis to consumers. The dynamic services framework abstracts the access of different resources, thereby shielding subscribers from the overhead of dealing directly with the service and content providers, and the use of the input adapters 434, the output adapters 435, the execution adapters 437 and the protocol adapters 438 allows for extensible execution flow and customizable input and output transformations.

Overview of Syndication Process

To obtain content provided by web services and other resources, the subscriber 403 first acquires a catalog of subscription offers from the syndicator 401. Information describing offered services and content is obtained from the service providers 405 and the content providers 407 by the affiliates manager 427 as provider profile data at 431. To create a subscription, the subscriber selects a desired offer. When the selected offer contains terms which are designated as being negotiable, a process of negotiation between a subscriber 403 and the syndicator 401 regarding business terms and delivery policies may be conducted by the subscription manager 426. A subscription is considered established when both sides agree on all details.

The next step comprises of the actual information access from the syndicator for one or more subscriptions to the subscriber. The content offer from a content provider 407 specifies a delivery policy which consists of two possible actions: a subscriber PULLing content from the syndication server and/or the syndication server PUSHing content to the subscriber. In a PULL scenario, a subscriber 403 initiates the content access request which is then executed by the syndicator 401 while, in a PUSH scenario, the syndicator 401 initiates the content delivery to the subscriber on a scheduled basis or in response to a set of one or more specified triggering events.

Although a subscriber 403 and the syndicator 401 are logically separate entities, the syndicator 401 can play the role of a "subscriber" to obtain content from other syndicators (not shown), and a subscriber may also publish content, acting as a "syndicator" to other subscribers. The syndicator 401 is thus configurable to act as either the content syndicator or the content subscriber, or both.

Syndicator Overview

The preferred embodiment of the invention provides a comprehensive mechanism for deploying web services and distributing content and other digital assets on a subscription basis. The syndicator makes use a dynamic services framework to extract or adapt information from existing web sites, databases, enterprise applications, e-mail repositories, and legacy systems, and to syndicate that information to its subscribers. The syndicator further provides a web services framework for accessing web services using SOAP, WSDL, UDDI and other standard protocols. These information and content sources are thereby consolidated into one single point of access which is revealed to potential subscribers as a catalog of available services and content.

The syndicator 401 preferably includes means for personalizing subscriptions and content delivery for each subscriber based on subscriber profiles stored at 431. Content delivery is automated by pushing content to subscribers on an event driven basis when information relevant to them changes, or based on a predetermined push delivery schedule. The dynamic services framework can transform content from any formatted source to a markup language suitable for the subscriber. Each content source is modeled as a set of services in the dynamic services framework. At runtime, the syndicator 401 processes a subscriber's content request by invoking the components associated with that subscriber and the requested content or service, and sends back content responses correspondingly. Additionally, the syndicator 401 includes administrative tools that monitor the system and manage subscriptions and subscriber and content resources profiles.

In accordance with a feature of the invention, web service consumers modeled as subscribers access web services via the syndicator 401, rather than on a direct peer-to-peer basis between the consumer and the service provider. In this way, the syndicator 401 manages and monitors web service execution in accordance with the terms of the business relationship defined in a "subscription."

Uniform Access to Web Services on a Subscription Basis

Web service providers may define web services to provide access to existing or new applications. Developers and administrators create services by defining the various properties of the information source to be accessed, and the syntax of the service request and response. The resulting service package is typically structured as the content of directory that contains a main service descriptor file expressed in WSDL, the Web Services Description Language, version 1.1 of which is described in the W3C Note dated Mar. 15, 2001 available http://www.w3.org/TR/2001/NOTE-wsdl-20040315.

WSDL is an XML format for describing network services as a set of endpoints operating on messages containing either document-oriented or procedure-oriented information. WSDL is extensible to allow description of endpoints and their messages regardless of what message formats or network protocols are used to communicate. The above-identified WSDL version 1.1 note describes how WSDL is used in conjunction with SOAP 1.1, HTTP GET/POST, and MIME protocols.

To make a web service available via the syndicator 401, a service descriptor file is created by the web services provider and contains:

(1) An XML schema interface description that specifies how to access the service;
(2) An endpoint access description that indicates how to access the source of the service, including what input protocol adapter 434 to use;
(3) An execution flow description that details how the service is executed, including how multiple services are combined, any conditional logic used, and the identification of the execution adapter 437 to use; and
(4) References to protocol adapter 438, output adapter 439 and XSLT style sheets that perform format mappings and other transformations on response data from the service provider before it is made available to the subscriber.

The service description as stored in the service registry 431 is an XML service descriptor which contains tagged elements as described in Table I below:

TABLE I

| Service Descriptor XML Tags | Description |
| --- | --- |
| < SERVICE_HEADER> | Contains meta-information such as service name, classification, version, provider information, and the URL used to access the service. |
| < INPUT> | Specifies the input adapter 434 and its parameters |
| < EXECUTION> | Specifies the execution adapter 437 and its parameters |
| < PROTOCOL> | Specifies the protocol adapter 438 and its parameters |
| < OUTPUT | Specifies the output adapter 439 and its parameters |

Within the service registry 431, the service may be classified under an LDAP or UDDI category specified in the service descriptor, making it available to service consumer applications. Registration is performed by the affiliates manager using a command-line interface accessible to a system administrator.

Subscribers may access the catalog of available digital assets, including web services, as seen at 409. In addition, potential subscribers may also execute a run-time lookup in the services registry 431. The lookup can be based on name, category, or keywords, and the syndicator 401 will inspect the inputs and outputs to verify the service has the desired interfaces. Service descriptions in the service registry 431 may also be published as WSDL service descriptions in other UDDI registries as illustrated at 450 to support Internet-wide service discovery, and services described using WSDL can be imported into the syndicator's service registry 431 from a remote UDDI registry 450, or from the service registry of another syndicator (not shown).

Invoking Services

To invoke a web service, a subscriber 403 submits an XML service request (typically using the SOAP protocol) to the syndicator 401. Subscribers may be provided with a client library that includes connection drivers that allow different connection paths from applications to the syndicator 401 in a fashion similar to opening a database connection, thus facilitating the integration of web services into client applications.

These connection drivers may include direct drivers for local synchronous access to services through direct method calls as well as HTTP/HTTPS drivers for remote synchronous access to services.

A subscriber 403 invokes a web service by issuing a service request that includes a service identifier. The request manager 423 accepts the service requests from the client application, validates the requests against the service description and subscription terms under which the service is made available to the requester, determines how the service is to be executed as specified by the service description, sets up the service execution environment using the adapters and style sheets identified in the service description, and issues service execution requests to service providers using the identified adapters. The syndicator 401 receives the response from the connected service provider 405, transforms the information for the subscriber using the selected output adapter 439, and returns the response in proper form to the requesting subscriber 403. The syndicator 401 can execute services in synchronous as well as asynchronous mode, depending upon the configuration of the client application.

As an example, consider a simple service that takes a book title as a request and accesses a service provider to return its price as a response. In this case, the execution adapter 437 simply passes the XML request from the input adapter 434 to the protocol adapter 438. The protocol adapter 438 sends an HTTP request to the URL specified in the service description, and receives the HTTP response from the provider using the SOAP protocol. The execution adapter 437 sends the result message from the service provider 405 to the selected output adapter 439 that uses an XSLT style sheet specified in the service description to transform the returned message content into the required XML-formatted service output.

Adapters

The syndicator 401 includes a number of standard adapters which may be used to handle most exchanges, including XSLT input and output adapter for translating the format of XML input and response messages and protocol adapters for handling HTTP/HTTPS, JDBC, SMTP and SOAP messages. Developers can also easily extend the framework by creating their own adapters to manage specific tasks (such as connecting to legacy systems) and, once a custom adapter is created, it can be used by all services.

The execution adapters 437 execute service requests in a particular flow, minimally relaying a request to contact a resource provider, and relaying the response. Standard adapters include: simple, compound, failover, and conditional adapters:

Simple services access a single resource provider. As with all web services, simple adapters use XML as a uniform method of access. The service is defined by an XML service descriptor and includes the various properties about the resource to be accessed and the syntax of the service request and response.

Compound services are assembled from two or more simple services. Compound services encapsulate the execution of multiple services by combining them into a graph of service executions. The syndicator coordinates the execution of the modules according to the graph specifications.

Failover services use as parameters an ordered list of compatible services (that is, services that respond to the same service interface). At execution time, the syndicator executes the list in order until it finds a service that executes with no exceptions.

Conditional services control the flow of execution by executing services based on the values of particular input request parameters.

Content Delivery

The configurable adapters employed by the syndicator 401 allow it to be used not only with standards-based web services but to adapt any content/information from web sites, Internet applications or databases into an XML representation and to transform that XML representation into a markup language specific to the subscriber through the use of XSL style sheets. Each content source is modeled as a set of services and the information about the subscribers, content resources, and the existing subscriptions are stored in syndicator 401. At runtime, the syndicator 401 processes subscriber's content requests by invoking the corresponding components and sends back content responses correspondingly.

In PUSH mode, upon the notification of content updates, the syndication server engine checks its local registry to locate relevant subscribers and then pushes the updated information according to the delivery policy specified inside the subscription for each subscriber. All events are logged to support reporting and billing functions.

The syndicator 401 interacts with content providers 407 the dynamic services framework described above through which syndicator 401 exposes content providers to subscribers as a set of services. Requests from the subscribers 403 are mapped to a corresponding service execution specified in the services registry 431, permitting content to be exchanged across boundaries among different networks, protocols, or even using web service models. The syndicator 401 can accordingly be viewed as digital asset hub for aggregating content from all types of providers, including both web service providers, sources of content, legacy applications, and so forth, regardless of location, access protocol, or content format.

Required Provider Services

Every provider which deploys services or content using the syndicator 401 must comply with the pre-defined dynamic services interface. When a request for content is received from a subscriber by the request manager 423, a service request that identifies a specific service defined in the service registry 431 is issued for execution. The response from a service provider 405 or a content provider 407 is collected by the syndicator 401 and returned to the requesting subscriber.

Each content provider is required to supply a minimum set of services which are deliverable via the syndicator 401. These minimum services consist of:

(1) A "catalog" service by which the content provider provides catalog information describing each offered service. The service interface for the "catalog" service is defined like any other service in the service registry and is used to enforce the uniform, predetermined input and output formats for all individually developed "catalog" services. However, each content provider defines the semantics of a subscription offer.

(2) A "subscription approval" service which may be used by certain content providers to approve subscriptions before they are activated. The subscription approval service accepts a subscription request from a subscriber and forwards it to the content provider for approval. If the content provider agrees on all the terms stated by the subscriber in the subscription request, the subscription is stored for execution in the service registry 431. Upon a disagreement, an exception will occur so that the syndicator 401 will start a negotiation process with the subscriber.

(3) A "content access" service by which a service provider 405 or a content provider 407 delivers content defined by a stored subscription. The subscribers 403 are allowed to initiate the process of pulling content from the syndicator 401, and content may be pushed to the subscribers 403. Both push and pull modes of content access cause a content access service to be executed. The content access service accepts a unique subscription identifier as the input in order to collect all the related information and construct a response payload using the interface specified in the service registry for that subscription.

(4) A "subscription cancellation" service which subscribers 403 may invoke to cancel their subscriptions. When this occurs, the syndicator 401 forwards the cancellation request to the service cancellation service implemented by the provider to allow the provider to perform any subscription based "clean ups" that may be desired, and the subscription as stored in the service registry 431 is deleted.

Subscriber-Syndicator Communications

A Content Subscriber Development Kit (CSDK) is preferably made available to make it easier for subscribes to implement applications which can communicate with the syndicator 401 using the ICE protocol. The Content Subscriber Development Kit contains a client library that abstracts to some extent the formation of ICE messages from the subscriber's perspective, so applications can be easily developed without being coupled with the underlying communication protocol with the server.

The Transport Manager 411 handles both PULL and PUSH content deliveries from the syndicator 401 to the subscribers 403. . In the PUSH scenario, subscribers may each speak a protocol-specific language, which will typically take the form of an XML-based markup language. In order to deliver information to a specific subscriber, the transport manager 411 must transform the XML-formatted content to an appropriate subscriber-specific markup language and transport the content over a specified transport layer. This is done using dynamic services to select and execute a specific protocol.

The request manager 423 processes requests from a subscriber 403 and provides an abstraction over the different messages protocols the message manager interprets the content of incoming messages and serves as the interface for all incoming requests, dispatching them to the subscription manager 425, the affiliates manager 427 or the message manager 429 based on their content. The request manager carries out two tasks:

(1) request retrieval and handling: the request manager retrieves each subscriber request from the communication channel and invokes the message manager 429 to establish a new instance of a request handler for that request; and (2) content delivery: the request manager oversees the invocation of the transport manager 411 for delivery of requested content to subscribers.

The specific request handler created by the request manager 423 will process subscriber requests, invoking the corresponding adapters specified in the service registry 431. It manages the runtime creation of the adaptors specified for use by a selected provider based on the request and the content provider profiles stored at 428. For each type of subscriber's request, there is a specific request handler mapped to it (e.g. a catalog request is mapped to a catalog request handler). The request manager 423 handles unrecognized requests by returning an "unsupported action" error to the subscriber.

The subscription manager 425 manages and stores profile data about all subscriptions as indicated at 426. Upon a content access request, the subscription manager 425 is responsible for determining whether a subscription request is a valid request with respect to the terms established for the specified subscription.

Tha affiliates manager 427 manages and stores provider profile data as indicated at 428. The affiliates manager 427 maintains profiles of each service provider 405 and content provider 407 ("affiliates" to the syndicator 401). A provider's profile data stored at 428 includes its preferred prolog adapter 438 and output adapter 439, all necessary parameters to these adaptors, as well as its delivery policy, its business terms, and its account and billing preferences.

Syndicator Operations

The major operations involved in processing a request from a subscriber by accessing a specific content resource through the syndicator 401 are described below to illustrate the scenario of communication between the syndicator 401 and a subscriber 403, a service provider 405 or a content provider 407.

1. Setting up a subscriber account: Before a customer can access syndicator 401, he or she needs an account. After reviewing all contractual, monetary, and business implications of the relationship between syndicator and this potential subscriber, the administrator of the syndicator will use an administrative interface to the syndicator 401 to invoke the subscription manager 425 to create a user account for that customer and send back a confirmation message to the subscriber. The subscriber then receives the information regarding its account (subscriber identification and location of the catalog of subscription offers) and how to obtain that catalog.

2. Catalog aggregation: A subscriber 403 starts its relationship with the syndicator by submitting a "get-catalog" request as seen at 503 in FIG. 4. o obtain the offers that make up a catalog, the syndicator 401 invokes the catalog service of each service provider 405 and content provider 407 that this subscriber can access based on its profile. After all responses have come back from those providers as illustrated at 505, the syndicator 401 constructs one catalog response and returns it to the subscriber as seen at 507. Each content catalog from a given provider is considered as one offer group in the generated catalog response returned to the subscriber, with each offer group being marked by that content provider's unique identifier. Note that, since each provider's catalog service is invoked through the dynamic services execution model, the syndicator 401 is able to aggregate content catalogs from a variety of content providers.

3. The subscription process is illustrated in FIG. 5: After reviewing the catalog from syndicator 401, the subscriber 403 chooses one content offer and requests an approval of a subscription for it from syndicator as indicated at 603. Along with the request, the subscriber also provides its preferences with respect to negotiable parameters, such as different possible delivery policies and business terms. Upon receiving the "subscription" request, the syndicator 401 invokes the subscription manager 425 seen in FIG. 3 to process it. If necessary, the corresponding content provider is also involved to process the "subscription" request as indicated at 605. A negotiation process might be possible on a mutually agreeable set of parameters between the syndicator 401 and subscriber 403 without the direct participation of the designated provider. The subscription manager reviews and validates the subscription as negotiated at 607 and, if it is acceptable, a confirmation notice is returned to the subscriber 403 as seen at 609.

4. Unsubscribe: Under certain circumstances, a subscriber may choose to terminate one of its established subscriptions.

A "cancel subscription" request is issued to syndicator 401 by the subscriber 403. The syndicator 401 then updates its local repository and optionally informs the relevant content provider about the cancellation.

Figure 6:
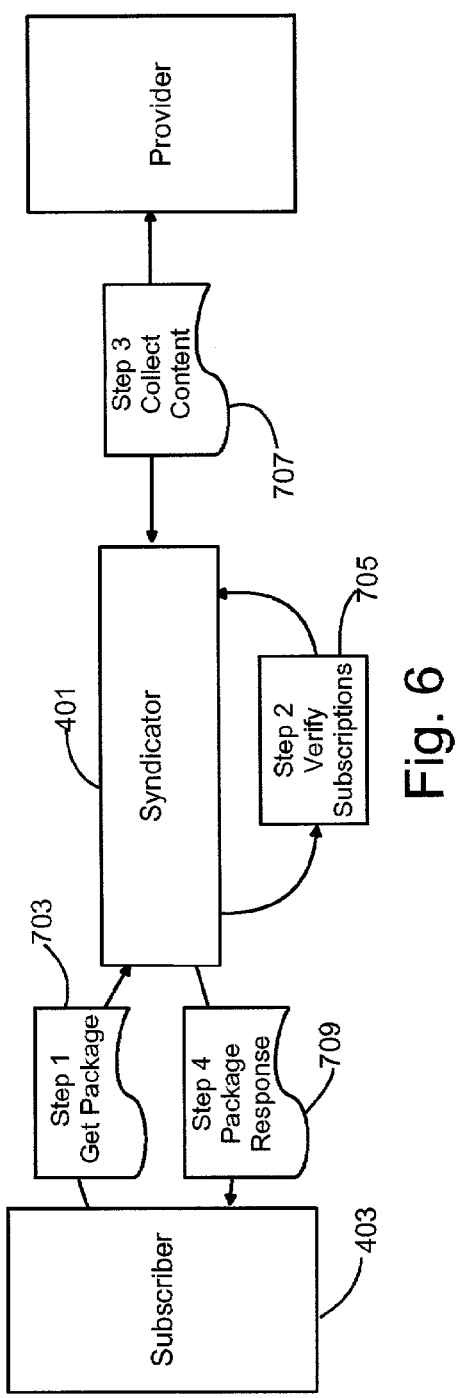
FIGS. 6 and 7 are data flow diagrams illustrating how data is pulled by and pushed to subscribers.

5. PULL content delivery is illustrated in FIG. 6: Content PULL occurs when a subscriber initiates a "get package" request for certain content from the syndicator 401 as seen at 703. If the "PULL" content delivery is enabled in the subscription specified in the request as verified at 705, the subscriber 403 is permitted to request content from syndicator 401 by providing the subscription ID. The syndicator 401 will collect content from the corresponding content provider as seen at 707 (if not already in cache storage) and return it to the subscriber as indicated at 709.

Figure 7:
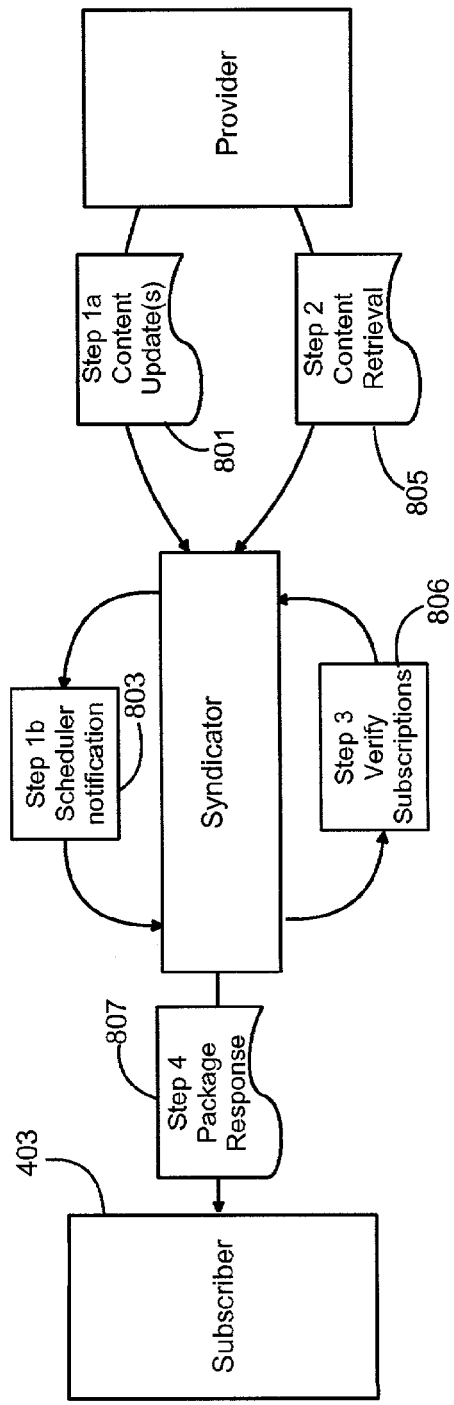

6. PUSH content delivery is illustrated in FIG. 7: Content PUSH occurs when the syndicator 401 initiates content delivery to subscribers. PUSH content delivery is driven by two types of notifications:

a. Provider generated: A provider sends an update notification as indicated at 801 to the syndicator 401, typically indicating that new content is available for transmission to subscribers; and/or b. Syndicator generated: when the delivery policy specified in a subscription defines a content update interval, a system scheduling function will be started by syndicator 401 as indicated at 803 which performs content delivery in accordance with an established schedule or in response to the satisfaction of predetermined conditions that may trigger a content PUSH by first obtaining new content from the provider(s) as seen at 805, identifying and verifying subscriptions to that content as seen at 806, and transmitting the content to the appropriate subscribers as seen at 807.

CONCLUSION

It is to be understood that the specific embodiment of the invention that has been described is merely one illustrative application of the principles of the invention. Numerous modifications may be made to the methods and apparatus described without departing from the true scope and spirit of the invention.

What is claimed is:

1. A computer-implemented syndicator connected to a communications network for establishing subscription agreements between subscribers and network service providers and for distributing information via said network in accordance with said subscription agreements, wherein said syndicator includes a processor and a memory unit, said syndicator comprising, in combination, a registration database coupled to said network for storing a plurality of service descriptions, each of which specifies: a network address to which a request for performance of a specific network service should be directed, the input information which should accompany said request, the output information produced by said performance of said specific network service, and business terms upon which said specific network service is offered to prospective subscribers, a subscription manager for receiving from an individual subscriber an acceptance of said business terms upon which a particular one of said network services is offered to establish a subscription agreement between said individual subscriber and the provider of said particular one of said network services, a message handler for receiving a service request from said individual subscriber seeking output information produced by said performance of said particular one of said network services, transaction validation means for confirming that a subscription agreement has been established between said individual subscriber and said the provider of said particular one of said network services, execution means for invoking said particular one of said network services on behalf of said individual subscriber in accordance with said subscription agreement, and accounting means for recording information describing the delivery of information to said individual describer in accordance with said subscription agreement;

where said registration database further includes registration means for accepting at least a portion of the service description for an offered network service from the provider of said offered network service, said portion of the service description being expressed in the Extensible Markup Language; and where said communications network is the Internet, wherein at least some of said network services are standards-based Web services provided by service-providing application programs that can be discovered, accessed and automatically executed over the Internet using standard protocols by a remotely located application program that invokes the execution of said Web services on behalf of said individual subscriber in accordance with said subscription agreement.

2. The computer-implemented syndicator as set forth in claim 1 further including means coupled to said registration database for transmitting a catalog listing of available network services in response to a request from a prospective subscriber, said catalog listing of available services being compiled by said syndicator from said plurality of service descriptions stored in said service registry.

3. A computer-implemented syndicator for processing a request received from a subscriber via the Internet for information from a selected Web service, wherein said syndicator includes a processor and a memory unit, said syndicator comprises, in combination, a registration database for storing a service description for each of a plurality of different Web services each of which is provided by service-providing application program that can be discovered, accessed and automatically executed over the Internet using standard protocols by a remotely located application program that invokes the execution of said Web services on behalf of said subscriber, said service description comprising an input processing specification, an output processing specification, and the specification of business terms upon which said Web service is offered by its provider to subscribers, a subscription manager for receiving from said subscriber an acceptance of said business terms upon which said selected Web service is offered to establish a subscription agreement, an input message handler for receiving said request from said subscriber, a transaction validator for verifying that a subscription agreement has been established between said subscriber and a provider of said selected Web service, execution means for invoking performance of said selected Web service in accordance with the input processing specification contained in the service description for said selected Web service, an output message handler for receiving output information produced by said performance of said selected Web service in accordance with said output processing specification contained in the service description for said selected Web service and for transmitting at least a portion of said output information to said subscriber, and accounting means for recording information describing said performance of said selected service on behalf of said subscriber.

4. The computer-implemented syndicator as set forth in claim 3 wherein said registration database further includes registration means for accepting descriptive data via the Internet from one or more providers of available Web services and for processing said descriptive data to service descriptions stored in said registration database.

5. The computer-implemented syndicator as set forth in claim 3 wherein in said input processing specification includes the designation of an Input adaptor program which, when executed, processes the message received by said input message handier.

6. The computer-implemented syndicator as set forth in claim 5 wherein said output processing specification includes the designation of an output adaptor program which, when executed, performs some of the processing performed by said output message handler.

* * * * *

UNITED STATES PATENT AND TRADEMARK OFFICE
CERTIFICATE OF CORRECTION

PATENT NO. : 7,496,637 B2  
APPLICATION NO. : 10/121633  
DATED : February 24, 2009  
INVENTOR(S) : Han et al.

Page 1 of 2

It is certified that error appears in the above-identified patent and that said Letters Patent is hereby corrected as shown below:

In column 4, line 61, delete "Framework" and insert -- Framework. --, therefor.

In column 5, line 13, delete "Engine" and insert -- Engine. --, therefor.

In column 9, line 67, delete "PUr" and insert -- PUT --, therefor.

In column 11, line 65-66, delete "information I contacts" and insert -- information/contacts --, therefor.

In column 14, line 13, delete "registration." and insert -- registration --, therefor.

In column 14, line 55, delete "service." and insert -- service --, therefor.

In column 15, line 8, delete "such." and insert -- such --, therefor.

In column 15, line 9, delete "custom." and insert -- custom --, therefor.

In column 15, line 66, delete "registration" and insert -- registration. --, therefor.

In column 16, line 12, delete "Component" and insert -- Components --, therefor.

In column 16, line 41, delete "Services" and insert -- services --, therefor.

In column 19, line 67, delete "www.w3.org/TR/soap 12-part0/." and insert -- www.w3.org/TR/soap12-part0/. --, therefor.

In column 22, line 9, delete "endpoint" and insert -- end point --, therefor.

In column 22, line 38, delete "<OUTPUT" and insert -- <OUTPUT> --, therefor.

In column 26, line 4, delete "Tha" and insert -- The --, therefor.

Signed and Sealed this

Eighteenth Day of May, 2010

David J. Kappos  
*Director of the United States Patent and Trademark Office*

In column 30, line 4, in claim 5, after "wherein" delete "in".

In column 30, line 5, in claim 5, delete "Input" and insert -- input --, therefor.

In column 30, line 7, in claim 5, delete "handier." and insert -- handler. --, therefor.